F. DENNINGER.
PEDAL MECHANISM FOR PIANOFORTES.
APPLICATION FILED AUG. 23, 1911.
1,062,955.
Patented May 27, 1913.
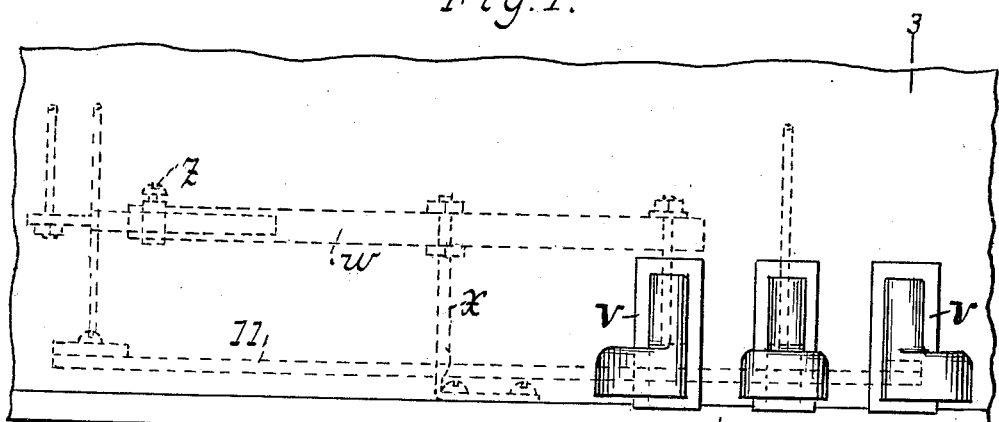
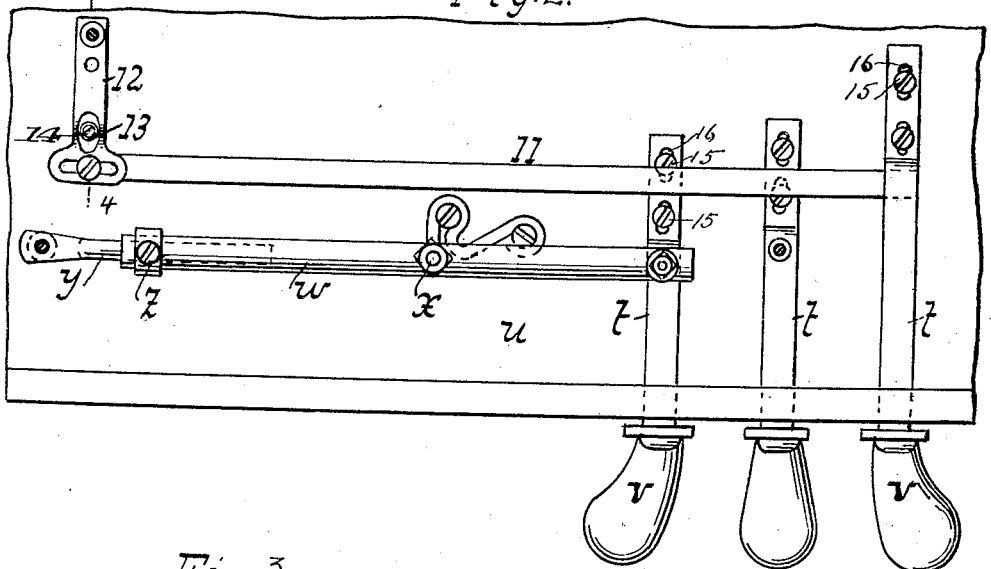
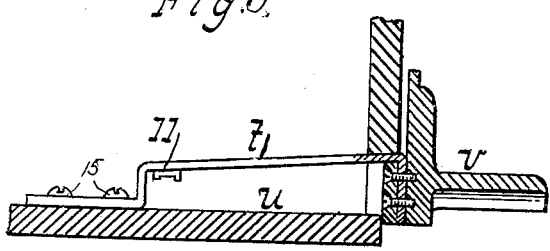
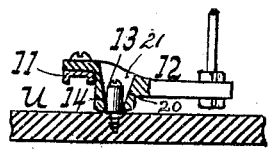
Witnesses:
William Miller
Chris. H. Olmstaedt
Inventor
Frank Denninger
By his Attorneys
Hauff & Harland

UNITED STATES PATENT OFFICE.

FRANK DENNINGER, OF NEW YORK, N. Y.

PEDAL MECHANISM FOR PIANOFORTES.

1,062,955.       Specification of Letters Patent.    Patented May 27, 1913.

Application filed August 23, 1911.   Serial No. 645,495.

*To all whom it may concern:*

Be it known that I, FRANK DENNINGER, a citizen of the United States, residing at New York, in the county of New York and State of New York, have invented new and useful Improvements in Pedal Mechanism for Pianofortes, of which the following is a specification.

This invention relates to pedal devices for piano fortes in which a flat spring extends through a slot formed in the case and is secured to a vertical portion of the pedal. In an arrangement of this kind the spring serves as a support, guide and fulcrum for the pedal.

Each pedal is connected to a flat spring fastened to the base board of the piano case and the spring serves as a fulcrum for the oscillation of the pedal. The advantage of this construction is that each pedal needs no post or fulcrum pins, the springs being fastened directly to the pedals thus act as levers. The soft or pianissimo pedal is connected to an adjustable lever, the fulcrum rod of which is springy to allow the lever to oscillate. The said fulcrum rod is fixed to the base and has no lateral movement so that the lever will swing in a direct curvilinear path.

The rock lever of the loud or fortissimo pedal has a fulcrum screw positioned in the case with a rubber sleeve to give noiseless movement to the lever.

The novel features of the invention are more fully described in the following specification and claims and illustrated in the accompanying drawings in which:

Figure 1 represents a front elevation of the pedal mechanism. Fig. 2 is a plan view of the same. Fig. 3 is a section along the line 3—3 of Fig. 1. Fig. 4 is a detail section along the line 4—4 of Fig. 2.

In this drawing the letter $t$ designates a spring having one of its ends fastened to the base or bottom board $u$ of the casing while the other end is fastened to a pedal $v$. This spring extends through a slot in the case and serves as a guide for the downward movement of the pedal and also as a stop for the upward movement of the same. By having the spring fastened to the pedal in the manner shown the slot in the casing will be entirely covered by the vertical portion of the pedal so that no injurious matter such as dust, insects or animals can get into the case.

Each spring is attached to the base of the case by means of screws 15 of suitable construction to extend through slots 16 formed in the heel of the spring, and each screw is fastened to the base. It will be readily understood that when the screws are loosened the spring can be moved within the limit of the slots and the pedal thus adjusted to its proper position in relation to the slot and case.

The soft pedal is connected to a lever $w$ which is fulcrumed at $x$ to a rod fastened to the base board of the casing. The said rod is springy and swings when the pedal is actuated with the bent portion as a fulcrum and the foot as a fixed point. As shown in the drawing, the foot portion of the said rod is of peculiar shape so that the screw-fastening devices will be out of line or to one side of the said lever and hence be accessible. The said lever $w$ has an end section $y$ telescoping into the lever and held in place by a set screw $z$. By this means the lever can be lengthened or shortened as required.

Fastened at one end of the loud pedal spring $t$ is a bar 11, extending laterally from said spring and secured at its opposite end to a rocking lever 12 having a foot piece 20 on its underside intermediate its ends, bearing on the base-board as represented in Fig. 4. A vertical opening 21 with tapering walls is formed through the rocking lever and its foot-piece to receive a fulcrum screw 13 and its surrounding resilient sleeve 14, by means of which sleeve the movement of the rocking lever is rendered noiseless. The forward end of the rocking lever 12 is quite short, and to this end the bar 11 is attached. The point at which the bar 11 is fastened to the pedal spring $t$, see Figs. 2 and 3, is such that when the pedal $v$ is depressed, the bar will be carried bodily downward a short distance, which movement, because of the rigidity of the bar (shown in the drawing as channeled), will be imparted to the short arm of the rocking lever 12 causing said lever to tilt on its foot-piece 20, and elevate its rear end which is made sufficiently long to properly operate the mechanism connected thereto.

I claim—

1. A piano comprising a case provided with a slot, a pedal having a vertically positioned portion to cover the slot, and an adjustable flat spring attached to the base of the case extending through the slot and secured to the vertical portion of the pedal.

2. A piano case provided with a slot, a pedal mechanism comprising a foot-operating piece or pedal proper, an outstanding portion on the pedal for covering said slot, a flat spring adjustably attached to the base of the case and extending through the slot and secured to the outstanding portion of the pedal, and means connected to said spring for operating the mechanism controlled by the pedal.

3. A pedal mechanism for musical instruments comprising a spring plate fixed at one end to the base of the instrument and bearing on its free end, a foot operating piece or pedal proper for depressing the spring plate, a rigid bar connected to said spring plate and extending laterally therefrom, said bar partaking of the movement of the plate, and actuating means connected to and operated by the bar.

4. A piano case provided with a slot, a pedal formed with a vertically positioned portion on its inner end to cover the slot, and a flat spring secured within and to the base of the case extending outwardly through said slot and fastened on the rear face of the vertical portion of the pedal.

5. A piano case provided with a slot, a pedal formed with a vertically positioned portion on its inner end to cover the slot, a flat spring secured within and to the base of the case and extending outwardly through said slot and fastened to the rear face of the vertical portion of the pedal, a lever connected to the spring, and a resilient rod secured at one end within the case and supporting by its other end said lever, said resilient rod adapted to oscillate with the lever as the pedal is depressed.

In testimony whereof I have hereunto set my hand in the presence of two subscribing witnesses.

FRANK DENNINGER.

Witnesses:
WILLIAM MILLER,
CHRIS. H. ALMSTAEDT.

---

Copies of this patent may be obtained for five cents each, by addressing the "Commissioner of Patents, Washington, D. C."